Nov. 30, 1937.   O. H. WEHRY   2,100,825
CLOTHESPIN
Filed Jan. 8, 1936
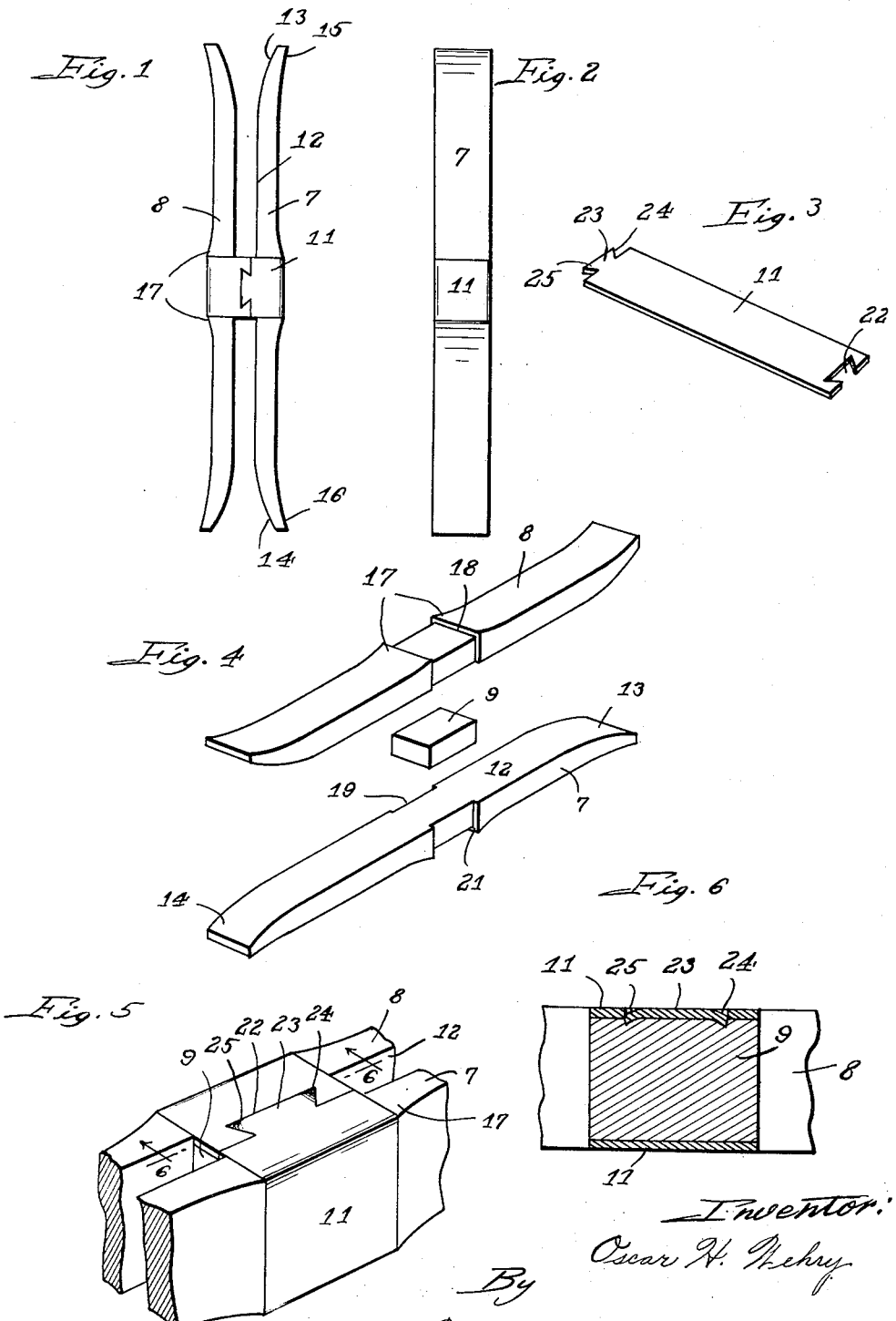

Patented Nov. 30, 1937

2,100,825

UNITED STATES PATENT OFFICE 2,100,825

CLOTHESPIN

Oscar H. Wehry, Rockford, Ill.

Application January 8, 1936, Serial No. 58,053

3 Claims. (Cl. 24—138)

This invention relates to a clothespin of novel construction.

The conventional type of clothespin is formed from a single piece of wood, usually about one inch square and of a desired length, by suitably turning and slotting the piece to produce the required shape. This type of pin is objectionable in a number of important particulars, for example, it requires in its manufacture lumber of considerable thickness approximating one inch and, therefore, the price of raw materials is comparatively high. In addition, a considerable amount of this material is wasted because the slots and the shape must be formed by cutting away portions of the solid block. Another objection is that pins of this character tend to split along the grain of the wood beginning at the bottom of the slot, this splitting being occasioned by the spreading of the prongs of the pin. A still further objection is the difficulty of producing smooth gripping faces on the prongs of the pins, as a result of which the faces are frequently rough and tend to tear or damage delicate fabrics.

An important object of the invention is the provision of a wooden clothespin of such form that it may be manufactured by high speed machine operations.

Another object of the invention is the provision of a wooden clothespin of such form as to be capable of manufacture with a minimum waste of material and from materials heretofore unsuitable for such use.

I have also aimed to provide a double-ended clothespin having greater strength in the areas of maximum strain.

A further object of the invention is the provision of a pin capable of manufacture of a smaller amount of wood than has heretofore been possible.

Other objects and attendant advantages will become apparent from the following description and the accompanying drawing, in which—

Figure 1 is a side view of a clothespin embodying my invention;

Fig. 2 is a face view thereof;

Fig. 3 is a perspective of the metal band prior to its application;

Fig. 4 is an expanded perspective view showing the manner in which the parts go together;

Fig. 5 is a fragmentary perspective view of the pin at the band, and

Fig. 6 is a section on the line 6—6 of Fig. 5.

The pin consists essentially of two strips of wood designated generally by the numerals 7 and 8 having a block 9 interposed therebetween substantially midway between the ends of the strips, the strips and block being rigidly held together by means of a band 11 encircling the strips at the block. Each of the strips has an inner face, the central portion of which is plane, as shown at 12, the ends flaring outwardly as shown at 13 and 14. The opposite side of the strip has the ends flared outwardly as shown at 15 and 16, and a pair of outwardly flared ribs 17 defining a recess 18 midway between the ends for the reception of the band 11. The recess 18 is of the same width as the band and is of a depth equal to the thickness of the band so as to present a smooth outer surface when the band is seated in the recess. The strips are slotted along their sides as shown at 19 and 21 to a depth equal to the thickness of the band for the reception of the band therein so as to present smooth sides on the pin.

The block 9 has a length substantially equal to the width of the band 11, and has a width substantially equal to the distance between the slots 19 and 21 so as to be concealed behind the band in the finished pin. The thickness of the block 9 determines the distance between the strips 7 and 8, and is of that thickness which experience has taught to be most desirable in a clothespin. The band 11 has a slot 22 at one end and an interlocking projection 23 at the other end and is wrapped around the strips 7 and 8 and the block 9 so as to rigidly hold these together. The ends of the band are interlocked at the side of the pin over the block 9, as best shown in Fig. 5, and points 24 and 25 of the projection 23 are forced downward, as shown at Fig. 6, so as to cut into the wood of the block 9 and retain this block against longitudinal movement.

Attention is directed to the fact that the strips 7 and 8 comprise thin substantially flat strips of wood. Advantageously the outer side of the strips is cut away slightly and the ends are flared outwardly on the inner side. However, I have found that eight of these strips of satisfactory thickness may be cut from a single inch square piece of wood so that a piece of wood one inch square and of suitable length provides strip material for the manufacture of four pins. This constitutes a considerable saving in material since the blocks 9 may be made of small pieces of waste material. Likewise the surfaces of the strips 7 and 8 are such that they may be cut by very high speed machinery which leaves a very smooth surface on the strips. As a result of this type of machine operations, the faces 12 of the strips are given a very smooth polish without additional cost. Likewise it will be seen that in the finished pin there is no tendency for the wood to split along the grain since the strain is taken up by the band 11 and the strain on the strips 7 and 8 is transverse to the grain. Furthermore, the strips are given additional thickness adjacent the band 11 at the point of maximum strain in order to prevent breaking of the strips.

Attention is directed to the fact that only a minimum of material is cut away as waste in the manufacture of the pins, this comprising a small amount at the flares 13 and 14 and a small amount between the flares 15 and 16 and the ribs 17. As a result of this small wastage of material and the construction of the pin from strips spaced by means of the block 9, the pin may be made from thin strip material which has heretofore been considered as undersize and has been incapable of use in the manufacture of a staple clothespin.

Another feature of the invention is that a double-ended pin is formed at a lesser cost than has heretofore been incurred in forming a single-ended pin, and that by thus forming the double-ended pin the strength in the pin has not been sacrificed, since the strips are firmly held against relative movement by the band 11 and the block 9.

While I have thus described and illustrated a specific embodiment of the invention I am aware that numerous alterations and changes may be made therein within the scope of the appended claims, in which I claim:

1. A clothespin comprising, in combination, two parallelly disposed strips of wood having opposed faces which are substantially plane through the major portion of their length and are outwardly flared at their ends, a short spacing block interposed between said strips substantially at the center thereof, and a metal band having interfitting dovetailed ends, the band encircling said strips and said block being seated in the outer faces of said strips flush with the surface thereof to clamp the strips and the block firmly together, the points of said dovetail being pressed inward for engagement with the wood of the pin.

2. A clothespin comprising in combination two parallelly disposed strips of wood having opposed faces which are substantially plane through the major portion of their length and are outwardly flared at their ends, the outer faces of said strips having spaced shoulders defining a transverse recess midway between the ends, said shoulders being formed by a gradual increase in the thickness of the strip to provide a greater amount of stock at the shoulders, said strips also having transversely disposed side recesses registering with the first mentioned recess, a short spacing block of a width substantially equal to the distance between the side recesses of a strip interposed between said strips substantially at the center thereof, and a metal band seated in said recesses encircling said strips and said block to clamp said strips and block firmly together, the ends of said band being dovetailed together and the flared points of the dovetail being pressed inward for engagement in the wood of the pin.

3. A clothespin comprising in combination two parallelly disposed strips of wood having opposed faces which are substantially plane through the major portion of their length, the outer faces of said strips having spaced shoulders defining a transverse recess midway between the ends, said shoulders being formed by a gradual increase in the thickness of the strip to provide a greater amount of stock at the shoulders, said strips also having transversely disposed side recesses registering with the first mentioned recess, a short spacing block of a width substantially equal to the distance between the side recesses of a strip interposed between said strips substantially at the center thereof, and a metal band seated in said recesses against said shoulders and encircling said strips and said block to clamp said strips and block firmly together.

OSCAR H. WEHRY.